United States Patent [19]
Wang

[11] Patent Number: 5,725,926
[45] Date of Patent: Mar. 10, 1998

[54] CAR FLOOR MAT

[76] Inventor: Ming-Ling Wang, 346-2 Chang Yuan Road Chang Sha Village, Hua Tan Hsiang, Changhua, Taiwan

[21] Appl. No.: 784,299
[22] Filed: Jan. 16, 1997
[51] Int. Cl.⁶ .............................. B32B 3/30; B32B 3/02
[52] U.S. Cl. .............................. 428/78; 428/95; 428/119; 428/120; 428/157; 428/167; 428/169; 15/217; 296/97.23
[58] Field of Search .............................. 428/87, 95, 85, 428/119, 120, 167, 169, 157, 78; 15/215, 216, 217; 296/97.23

Primary Examiner—Alexander Thomas
Attorney, Agent, or Firm—Beveridge, DeGrandi, Weilacher & Young LLP

[57] ABSTRACT

A car floor mat has a dustproof side and a waterproof side. The dustproof side is provided with a carpet body detachably secured to the dustproof side. The carpet body is provided in the underside thereof with a plurality of lumps which are made of a recycled rubber material for preventing the carpet body from skidding. The waterproof side is provided with a pluralith of straight drain trenches and curved drain trenches, and a margin trench. The dustproof side and the waterproof side can be used interchangeably.

2 Claims, 6 Drawing Sheets

CAR FLOOR MAT

FIELD OF THE INVENTION

The present invention relates generally to a floor mat, and more particularly to a removable floor mat for a car.

BACKGROUND OF THE INVENTION

As shown in FIG. 1, a car floor mat of the prior art is composed of a plastic body A, a carpet body B, a fabric margin C, and a seam D. The carpet body B is attached to a surface A1 of the plastic body A by means of the fabric margin C and the seam D. The carpet body g has a lumpy surface B1.

Such a prior art car floor mat as described above is defective in design in that the carpet body B is susceptible to becoming detached to the surface A1 of the plastic body A when the seam D is damaged or severed. In addition, the carpet body B is prone to become curved after it has been used for a prolonged period of time. Moreover, the lumpy surface B1 of the carpet body B has a very limited skidproof effect.

SUMMARY OF THE INVENTION

It is therefore the primary objective of the present invention to provide an improved car floor mat free from the shortcomings of the prior art car floor mat described above.

In keeping with the principle of the present invention, the foregoing objective of the present invention is attained by a car floor mat having a dustproof side and a waterproof side. The dustproof side has a carpet body which is detachably attached to the dustproof side, whereas the waterproof side has a plurality of straight drain trenches and curved drain trenches, and a margin trench.

The foregoing objective, features, functions, and advantages of the present invention will be more readily understood upon a thoughtful deliberation of the following detailed description of the present invention in conjunction with the accompanying drawings.

DETAILED DESCRIPTION OF THE EMBODIMENT

Figure 1:
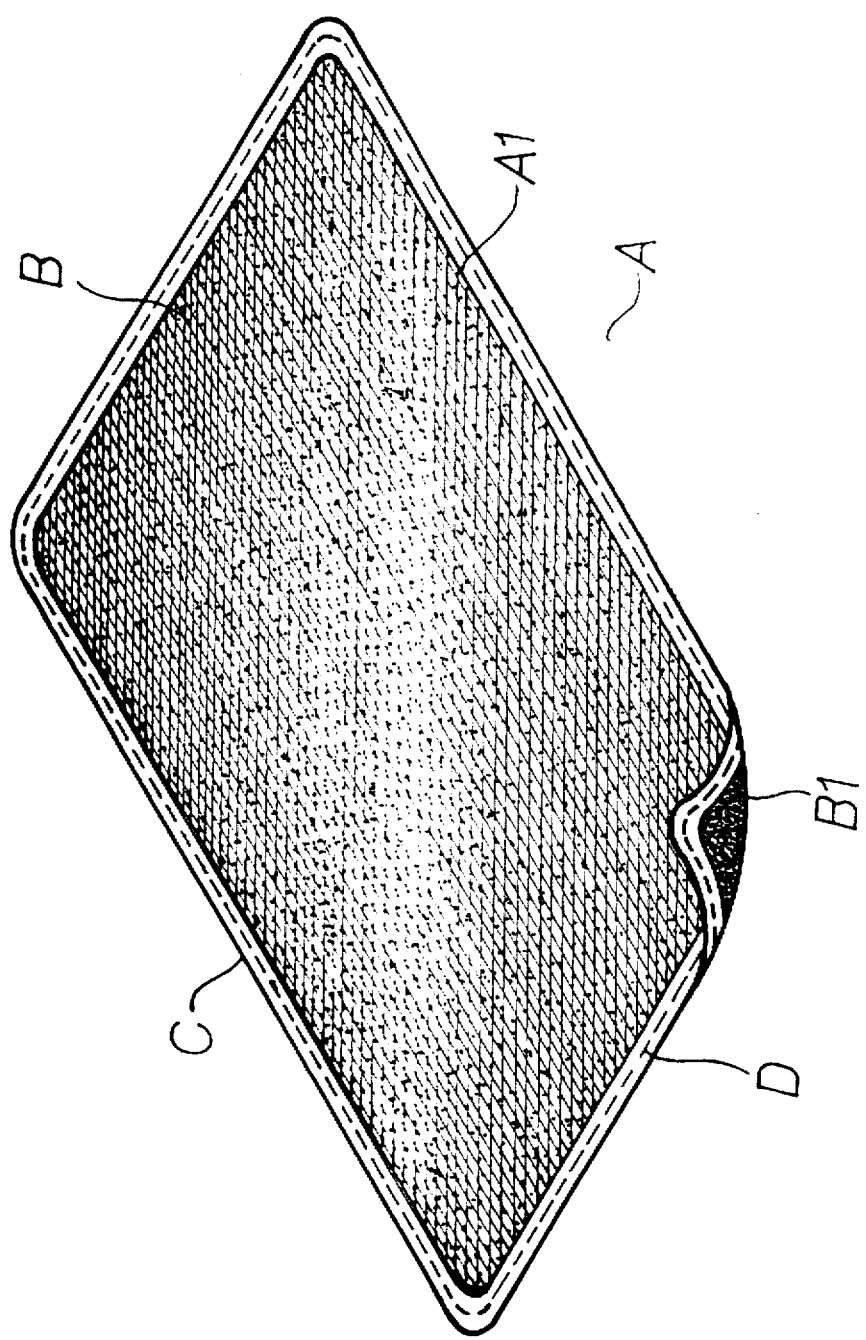
FIG. 1 shows a perspective view of a car floor mat of the prior art.
Figure 2:
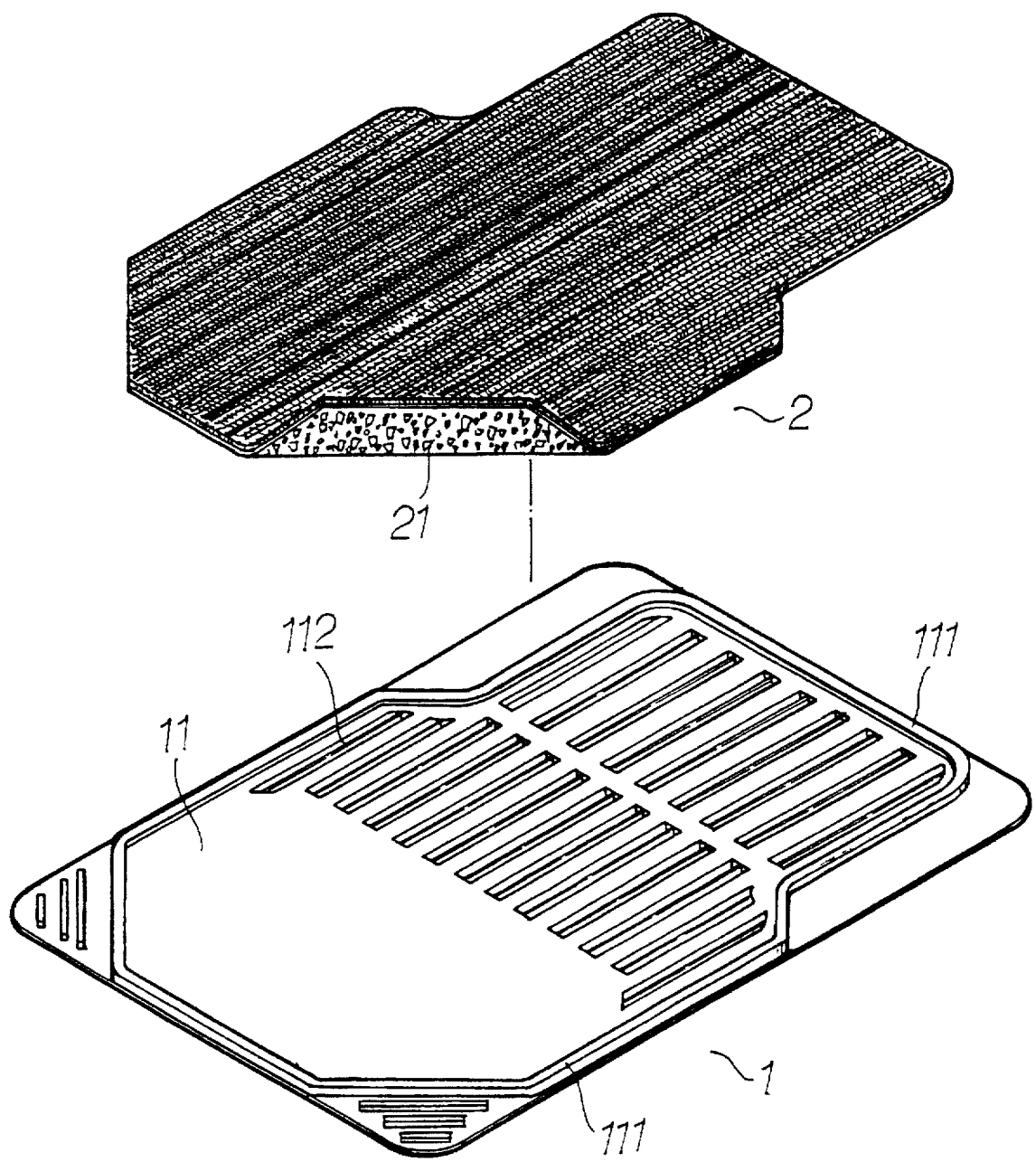
FIG. 2 shows a exploded view of a car floor mat of the present invention.
Figure 3:
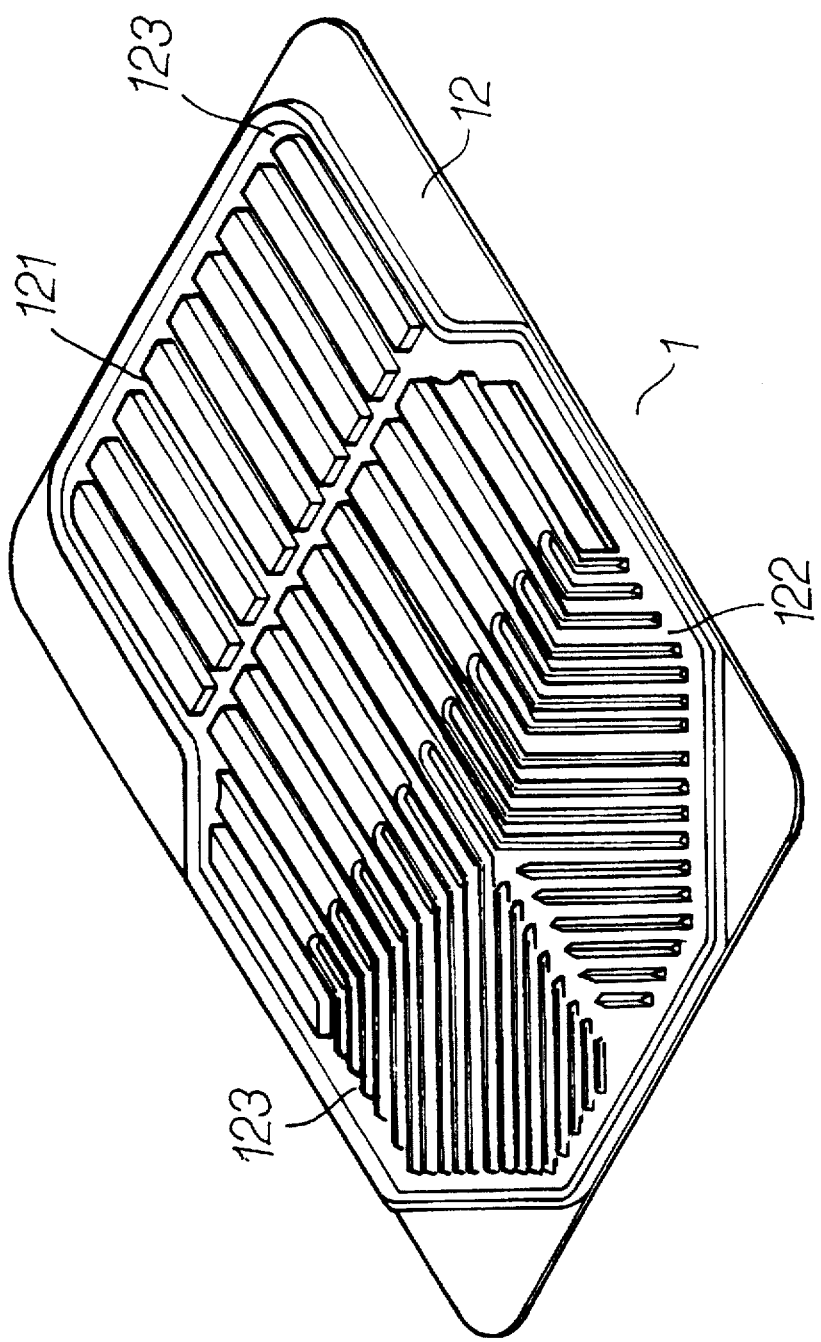
FIG. 3 shows a perspective view of the car floor mat in combination according to the present invention.
Figure 4:
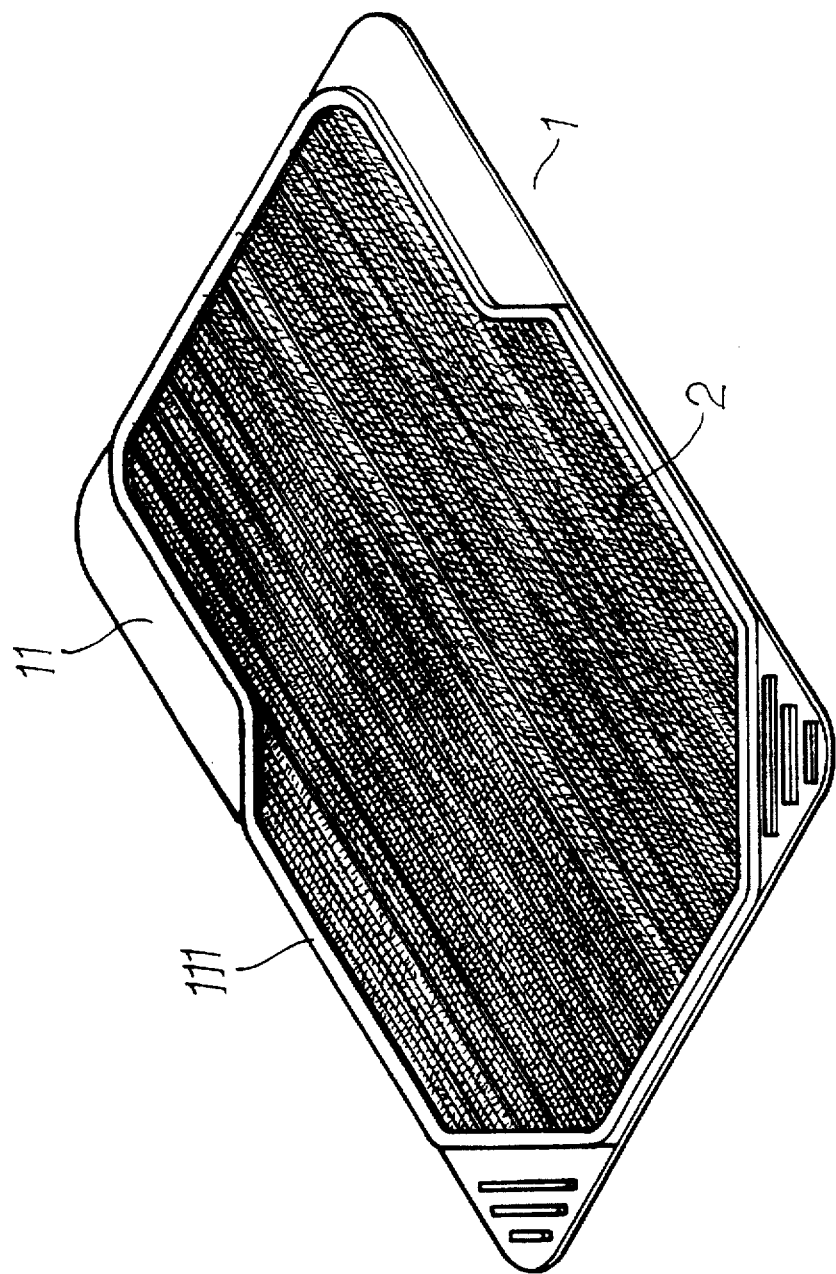
FIG. 4 shows another perspective view of the car floor mat in combination according to the present invention.
Figure 5:
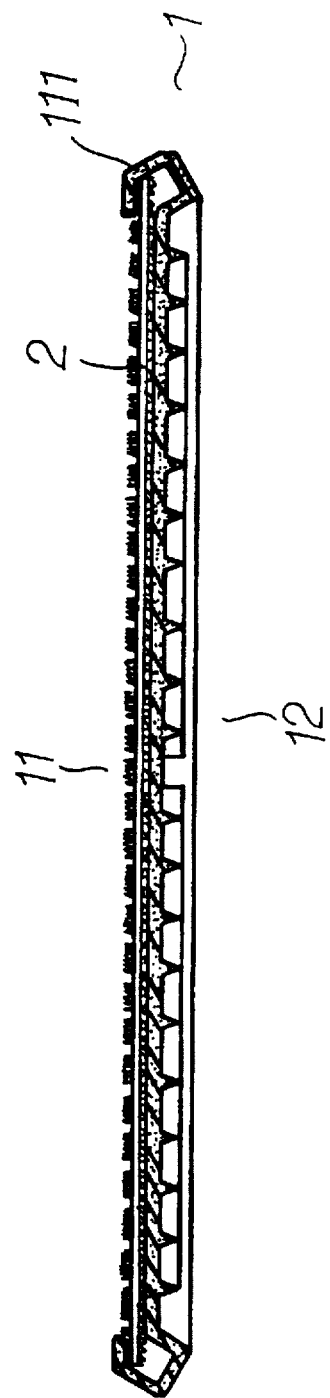
FIG. 5 shows a sectional view of the present invention.
Figure 6:
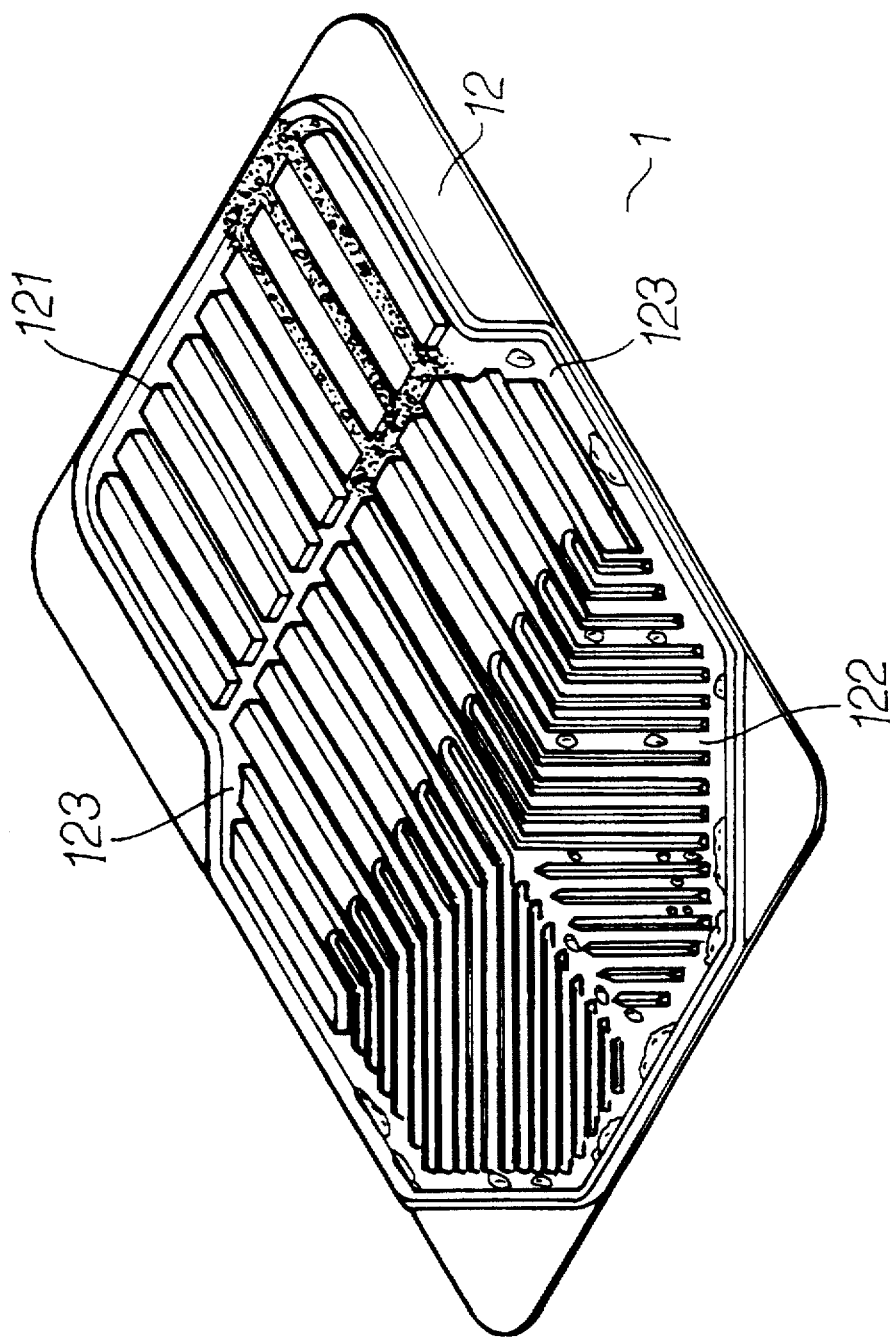
FIG. 6 shows a schematic view of the car floor mat of the present invention.

As shown in FIGS. 2-6, a car floor mat of the present invention has a mat body 1 which is made integrally of a rubber material and is composed of a dustproof side 11 and a waterproof side 12.

The dustproof side 11 comprises a rubber fringe 111, a plurality of straight slots 112 arranged regularly, and a carpet body 2 having in the underside thereof a number of skidproof lumps 21 made of a recycled rubber material. The carpet body 2 is detachably held in the dustproof side 11 by the rubber fringe 111 such that the carpet body 2 is prevented from being curved, and that the carpet body 2 can be detached from the dustproof side 11 to be cleaned or washed. The carpet body 2 is provided with the lumps 21 having a skidproof effect catable of locating the carpet body 2.

The waterproof side 12 has a plurality of straight drain trenches 121 and curved drain trenches 122, and a margin drain trench 123. The waterproof side 12 is intended mainly to collect water in the drain trenches 121, 122 and 123. In addition, the waterproof side 12 may be used for collecting dust, small pebbles, and other debris.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A car floor mat comprising a mat body made integrally of a rubber material and composed of a dustproof side and a waterproof side; wherein said dustproof side is provided with a rubber fringe, a plurality of straight slots arranged regularly, and a carpet body detachably held in said dustproof side by said rubber fringe; and wherein said waterproof side is provided with a plurality of straight drain trenches and curved drain trenches, and a margin drain trench.

2. The car floor mat as defined in claim 1, wherein said carpet body is provided in an underside thereof with a plurality of lumps which are made of a recycled rubber material and are attached securely to said underside of said carpet body for preventing said carpet body from skidding.

* * * * *